US012679023B2

(12) United States Patent
May

(10) Patent No.: US 12,679,023 B2
(45) Date of Patent: Jul. 14, 2026

(54) METHOD FOR PREPARING VIRTUAL BUILD VOLUMES

(71) Applicant: Stratasys Powder Production Ltd., London (GB)

(72) Inventor: Robert May, London (GB)

(73) Assignee: Stratasys Powder Production Ltd., London (GB)

( * ) Notice: Subject to any disclaimer, the term of this patent is extended or adjusted under 35 U.S.C. 154(b) by 461 days.

(21) Appl. No.: 18/547,061

(22) PCT Filed: Apr. 21, 2023

(86) PCT No.: PCT/GB2023/051061
§ 371 (c)(1),
(2) Date: Aug. 18, 2023

(87) PCT Pub. No.: WO2023/214146
PCT Pub. Date: Nov. 9, 2023

(65) Prior Publication Data
US 2024/0424732 A1 Dec. 26, 2024

(30) Foreign Application Priority Data
May 2, 2022 (GB) ...................................... 2206380

(51) Int. Cl.
*B29C 64/171* (2017.01)
*B29C 64/386* (2017.01)
(Continued)

(52) U.S. Cl.
CPC .......... *B29C 64/171* (2017.08); *B29C 64/386* (2017.08); *B33Y 10/00* (2014.12); *B33Y 50/00* (2014.12)

(58) Field of Classification Search
CPC ... B29C 64/171; B29C 64/386; B29C 64/153; B33Y 10/00; B33Y 50/00; G06T 2219/2016; G06T 19/20; G06F 3/1208
(Continued)

(56) References Cited

U.S. PATENT DOCUMENTS

2020/0406557 A1* 12/2020 Gonzalez Martin ... B33Y 50/02
2021/0331409 A1* 10/2021 Lopez ................... B33Y 30/00

FOREIGN PATENT DOCUMENTS

WO 2019/172935 A1 9/2019
WO 2020/122931 A1 6/2020
WO 2020/204899 A1 10/2020

* cited by examiner

*Primary Examiner* — Michael J Brown
(74) *Attorney, Agent, or Firm* — Honigman LLP; Eric J. Sosenko; Jonathan P. O'Brien

(57) ABSTRACT

A method for preparing virtual build volumes for the manufacture of three-dimensional objects. The virtual build volume represents an actual build volume over which one or more objects are to be built. The method includes the steps of: (a) receiving one or more object models, the object model(s) defining the intended dimensions of each of the objects; (b) applying a transformation to an initial virtual build volume to create a reduced virtual build volume smaller than the virtual build volume; (c) positioning the object model(s) within the reduced virtual build volume; and (d) applying an inverse transformation to expand the reduced virtual build volume to create an expanded virtual build volume including expanded object model(s); wherein each of the expanded object model(s) is larger than the respective object model(s).

19 Claims, 4 Drawing Sheets

(51) Int. Cl.
  *B33Y 10/00* (2015.01)
  *B33Y 50/00* (2015.01)
  *G06T 19/20* (2011.01)
(58) Field of Classification Search
  USPC ........................................................ 700/119
  See application file for complete search history.

METHOD FOR PREPARING VIRTUAL BUILD VOLUMES

FIELD OF THE INVENTION

The present disclosure relates to a method for preparing virtual build volumes to generate build data for an apparatus for the manufacture of three-dimensional (3D) objects. The method might find particular benefit to compensate for shrinkage in apparatus applying heat to form the object. A processor and a computer program for carrying out the method are also disclosed.

BACKGROUND

In applications for forming 3D objects that involve application of heat to consolidate the object, such as powder bed fusion applications including "print and sinter" and laser sintering build processes, object cross sections over successive layers of particulate material are heated so as to sinter or melt. In this way, the object as defined by build data is built layer by layer. Such processes involve material shrinkage that leads to dimensional inaccuracies of the object and requires to be compensated for. During preparation of build data, the physical build volume in the apparatus is represented by a virtual build volume, in which object models can be positioned. To provide layer by layer data to an apparatus for the layerwise formation of the object, the virtual build volume comprising the object models is processed to generate a stack of slices corresponding to each layer of the build volume comprising the objects to be built. Each slice may thus define a portion of a corresponding layer of build material that comprises an object cross section that is to be sintered or melted during the build process. Compensation may be applied during the process of generating the build data defining the object cross sections. Build data is generated by working within a virtual build volume, in which object models may be positioned. Conventional methods may compensate for shrinkage by expanding object models after positioning them in the virtual build volume. Such methods however are prone to errors when the objects models are placed too close to one another and/or to the boundary of the virtual build volume before expanding, since after expanding they may exceed a threshold in separation to one another and/or a boundary of the virtual build volume. This requires the expanded object models to be manually adjusted, which is time consuming. Thus conventional methods are not sufficiently addressing the problem of shrinkage, and are unnecessarily complex. Therefore, an improved method for the preparation of build data is needed.

SUMMARY

Aspects of the invention are set out in the appended independent claims, while particular embodiments of the invention are set out in the appended dependent claims.

The following disclosure describes, in one aspect, a method for preparing virtual build volumes comprising three-dimensional object models for an apparatus for the manufacture of three-dimensional objects, wherein the virtual build volume represents an actual build volume over which the one or more objects are to be built; the method comprising the steps of: (a) receiving one or more object models, the object models defining the intended dimensions of each of the one or more objects; (b) applying a transformation to an initial virtual build volume so as to create a reduced virtual build volume smaller in volume than the virtual build volume; (c) positioning the one or more object models within the reduced virtual build volume; and (d) applying, from a common origin of the reduced virtual build volume, an inverse transformation to expand the reduced virtual build volume comprising the one or more object models, such that the reduced virtual build volume and the one or more object models are expanded by the inverse transformation from the common origin to create an expanded virtual build volume comprising one or more expanded object models, wherein each of the one or more expanded object models is larger than the respective one or more object models and a distance from the common origin to each expanded object model is larger than a distance from the common origin of the reduced virtual build volume to the respective object model.

In a second aspect, a processor is provided that is configured to carry out the method according to the first aspect.

In a third aspect, a computer program is provided that comprises instructions which, when the program is executed by a processor, cause the processor to carry out the method according to the first aspect.

BRIEF DESCRIPTION OF THE DRAWINGS

Reference is now directed to the drawings, in which.

In the drawings, like elements are indicated by like reference numerals throughout.

DETAILED DESCRIPTION

Figure 1:
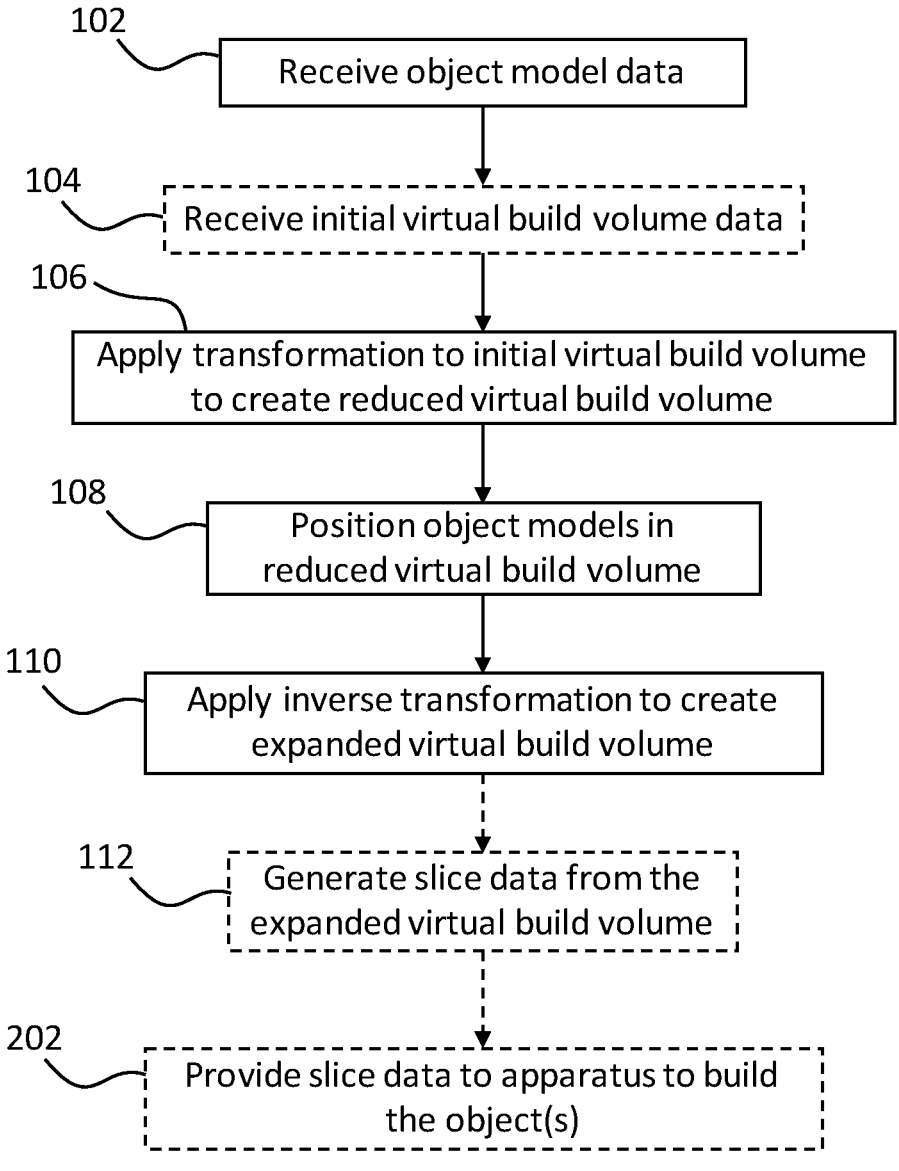
FIG. 1 is a flow chart according to the method of the invention.
Figure 2:
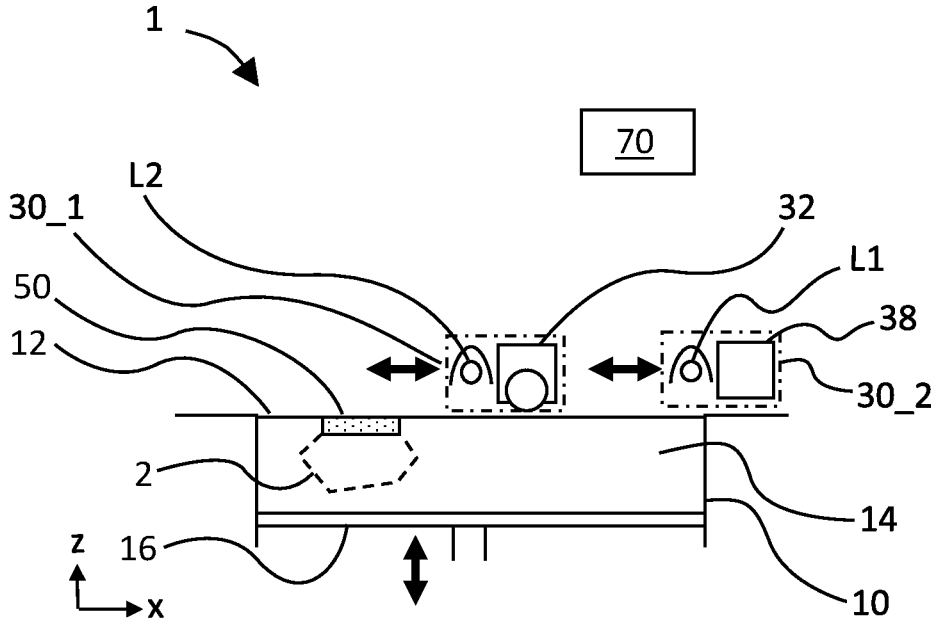
FIG. 2 is a schematic cross-section of detail of a side view of an apparatus configured to carry out the method according to the invention.

An improved method of preparing virtual build volumes to generate build data for an apparatus for the manufacture of 3D objects, such as for a powder bed fusion apparatus in which the object is manufactured layerwise from particulate material, will now be described with reference to FIGS. 1 and 2. Turning first to FIG. 2, a powder bed fusion apparatus as an example of a 3D printing apparatus and its basic operation will be briefly described to help illustrate the improved method. In FIG. 2 detail of a cross section of a print and sinter apparatus 1, a type of powder bed fusion type apparatus, is schematically illustrated. In a powder bed fusion process, successive layers of particulate material are distributed, each to form a build bed 14 supported on a platform 16. The build bed is progressively built up from individual layers, each new layer forming a build bed surface 12 which is then processed to form a cross-section 50 of the object 2. In this context, the reference to the 'build bed surface' is to the surface of the topmost layer of particulate material of the build bed 14.

As indicated in FIG. 2, the apparatus 1 comprises a build container having walls 10 and a build platform 16 that contain the object(s) within a build volume 14 of particulate material. The build platform 16 is arranged to move vertically along z within the walls 10, to lower or raise the build bed surface 12. The apparatus 1 further comprises, without specifically showing, a reservoir to supply particulate material to a dosing module that doses an amount of fresh particulate material to be distributed across the build volume (build bed) 14, thus forming a new build bed surface 12. Modules for distributing the particulate material and processing each formed layer are provided on one or more carriages 30 that are moveable back and forth above the build bed 14 across the layer. For illustrative purposes, FIG. 2 shows two such carriages: a first carriage 30_1 comprising a distribution module 32 to distribute a new layer of particulate material over the build bed 14 to form a new build bed surface 12; and a second carriage 30_2 comprising a droplet deposition module 38 for selectively depositing radiation absorber over the object cross section within the build bed surface 12, and a heat source L1 to heat the object cross section 50 so as to sinter or melt it and form a consolidated cross section of the object within the layer. The distribution module 32 may comprise a roller as indicated, or a blade. The droplet deposition module may comprise one or more printheads for depositing radiation absorbing fluid. The selectivity of the heat source L1 preferentially heating the object cross section 50 versus the surrounding area is achieved by providing the heat source L1 with a spectrum of radiation that, at least partially, overlaps with the absorption spectrum of radiation absorbing fluid but that is not significantly absorbed by the particulate material alone. If the combination of absorber amount and power input to the heat source L1 causes a sufficient energy input to the object cross section 50, the particulate material of the object cross section 50 melts or sinters to fuse and form consolidated particulate material.

A second heat source L2 may be arranged downstream of the distribution module 32, with respect to the direction of distribution, so as to immediately preheat the layer following distribution. Providing a second moveable preheat source L2 may be an effective way of returning the temperature of the new, and much colder, layer back towards a preheat build bed temperature. This may be done in combination with, or in addition to, operating a stationary overhead heater (not shown) provided above the build bed surface 12. The preheat temperature is typically lower than the melting temperature and higher than the solidification temperature of the particulate material. The particulate material may comprise polymer, for example a polyamide such as PA11 or PA12, or a polypropylene. For polyamide the preheat temperature may range from 180-190° C., and for polypropylene around 120-150° C. Meanwhile the heat source L1 may heat the object cross section 50 to a temperature of 200-210° C. in the case of polyamide and to about 160-170° C. in the case of polypropylene to achieve sintering or melting. These relatively high temperatures compared to ambient cause expansion upon heating and shrinking upon cooling of the build volume. In addition, sintering or melting causes densification and shrinkage of the material within the cross section, and these shrinkage effects require compensating for to ensure objects are built with sufficient dimensional accuracy. One solution may be to expand each object model in the data processing stage before positioning it in the virtual build volume. Where such positioning considers optimisation, so that the placement achieves an efficient utilisation of the virtual build volume, this may be referred to as 'nesting' the object models in the virtual build volume. Nesting may be applied to maximise the number of objects that can be built within the physical build volume, or to minimise the physical build volume and thus the build time. It was found that during positioning or nesting, a model may require rotating to optimise its position with respect to other models and/or boundaries. Where the expanding transformation is dimension (direction) dependent, this means that an expanding transformation applied before rotating the object model(s) requires correction after rotation. This leads to an iterative, time and resource intensive process.

The inventor has developed a reliable and efficient method for preparing virtual build volumes comprising three-dimensional object models that prevent such issues. The method will now be described with reference to FIG. 1, which is a flow chart illustrating the sequence of steps in terms of blocks, and comprises:

at block 102, receiving data representing one or more object models 22_n for one or more objects 2_n, the one or more object models 22_n defining the intended dimensions of each of the one or more objects 2_n;

at block 106, reducing the initial virtual build volume 24 to create a reduced virtual build volume 44 by applying a volume reducing transformation to the initial virtual build volume 24, such that the reduced virtual build volume 44 is smaller in volume than the virtual build volume 24. The reduction may be achieved by reducing the object model in at least one of its dimensions, for example at least along the vertical direction;

at block 108, positioning the one or more object models 22_n in the reduced virtual build volume 44; and at block 110, expanding the reduced virtual build volume 44 comprising the one or more object models 22_n by applying an inverse (volume expanding) transformation to the reduced virtual build volume 44. This results in an expanded virtual build volume 64 comprising one or more expanded object models 22_n'. Thus the same inverse transformation is applied from the same (common) origin to expand the reduced virtual build volume and the one or more object models to create the expanded virtual build volume comprising the one or more expanded object models. This results in each of the one or more expanded object models 22_n' being larger than the respective one or more object models 22_n, in for example the at least one dimension, so as to compensate for shrinkage. Furthermore, the distance from the origin of the reduced virtual build volume to a respective reference coordinate of each object model, such as its centre of mass or the surface coordinate of the object model nearest the origin, is increased according to the same inverse transformation. This results in an increased or expanded spacing between the expanded object models to ensure the expanded object models do not intersect. In other words, each of the one or more expanded object models is larger than the respective one or more object models, and a distance from the common origin of the expanded virtual build volume to any coordinate of each expanded object model is larger than a distance from the common origin of the reduced virtual build volume to a respective coordinate of each object model. Since the object models and a separation between them and a boundary of the reduced virtual build volume are expanded away from the origin by the inverse transformation, collisions or intersections between expanded objects models and respective separations between them and a boundary of the expanded virtual build volume are automatically avoided. In contrast, in compensation methods in which each object model is individually expanded with respect to a reference point of the object model itself, some points on one object model may be expanded towards the origin and some points on another object model may be expanded away from the origin, such that prevention of collisions and intersections cannot be easily guaranteed without taking additional steps. By scaling every point on every model from the same origin it may be guaranteed that the expanded object models are at least as far apart part as a minimum defined separation as will be described below. Thus the present method disclosed herein provides an efficient way of ensuring objects are built to the correct dimensions, while avoiding the need for manual corrections to positions of expanded object models to adjust separations between objects, and for time-consuming and/or computationally-demanding iterations of positioning and compensation necessary after optimisation and rotation of expanded object models.

At block 102, in the step of receiving data representing one or more object models 22_$n$ for one or more objects 2_$n$, the one or more object models 22_$n$ may be considered to be "input" object models. Thus, the step at block 108 may be considered to comprise positioning the one or more input object models 22_$n$ in the reduced virtual build volume 44, and the step at block 110 may be considered to comprise expanding the reduced virtual build volume 44 comprising the one or more input object models 22_$n$ by applying the inverse transformation to the reduced virtual build volume 44, to create the expanded virtual build volume 64 comprising the one or more expanded object models 22_$n$' as outlined above.

The transformation may be direction (dimension, axis) dependent, such that the build volume 14 and the object(s) 2 shrink differently along different directions in the build volume. For example an object may shrink differently in the vertical direction compared to the horizontal direction. If a direction-dependent inverse (expanding) transformation were to be applied to the object models 22_$n$ before positioning them in the virtual build volume 24, any subsequent rotation of the models to optimise the positions would require an adjustment or revision of the direction-dependent transformation to ensure that the compensation is applied in the correct way. If on the other hand the objects were to be placed in the virtual build volume 24 and individually expanded (while the virtual build volume 24 is not expanded), there is no guarantee that the spacings between object models or between an object model and one or more of the boundaries of the virtual build volume 24 would fall below a minimum threshold. Object models placed too close to one another may after expansion be too close or even overlap such that the corresponding objects fuse together, and object models too close to a boundary may lead to deformed or truncated objects. The current method prevents such problems by positioning or nesting the object models 22_$n$ in the reduced virtual build volume 44 and then applying the shrinkage compensation (the inverse, expanding transformation) from the same origin equally to both the reduced virtual build volume 44 and the positioned object models 22_$n$ comprised within it.

In variants of the method, the virtual build volume 24 may already be available to a processor carrying out the steps, for example in cases where the processor provides slice data to the same apparatus, or to the same type of apparatus having the same build volume 14. In other cases, the processor may provide slice data to different apparatus having different respective build volumes, where the processor either receives, or selects for a specific apparatus, the relevant data defining the virtual build volume. Therefore, at optional block 104, the method may comprise receiving data defining the initial virtual build volume 24 representing the actual build volume 14 over which the one or more objects 2_$n$ are to be built. It is not essential that the object model data is received before the data defining a virtual build volume 24 is received at optional block 104, or before the reduced virtual build volume is created at block 106. The step of receiving object model data at block 102 may occur at any time before the step of positioning the object models 22_$n$ in the reduced virtual build volume 44 at block 108.

Figure 3:
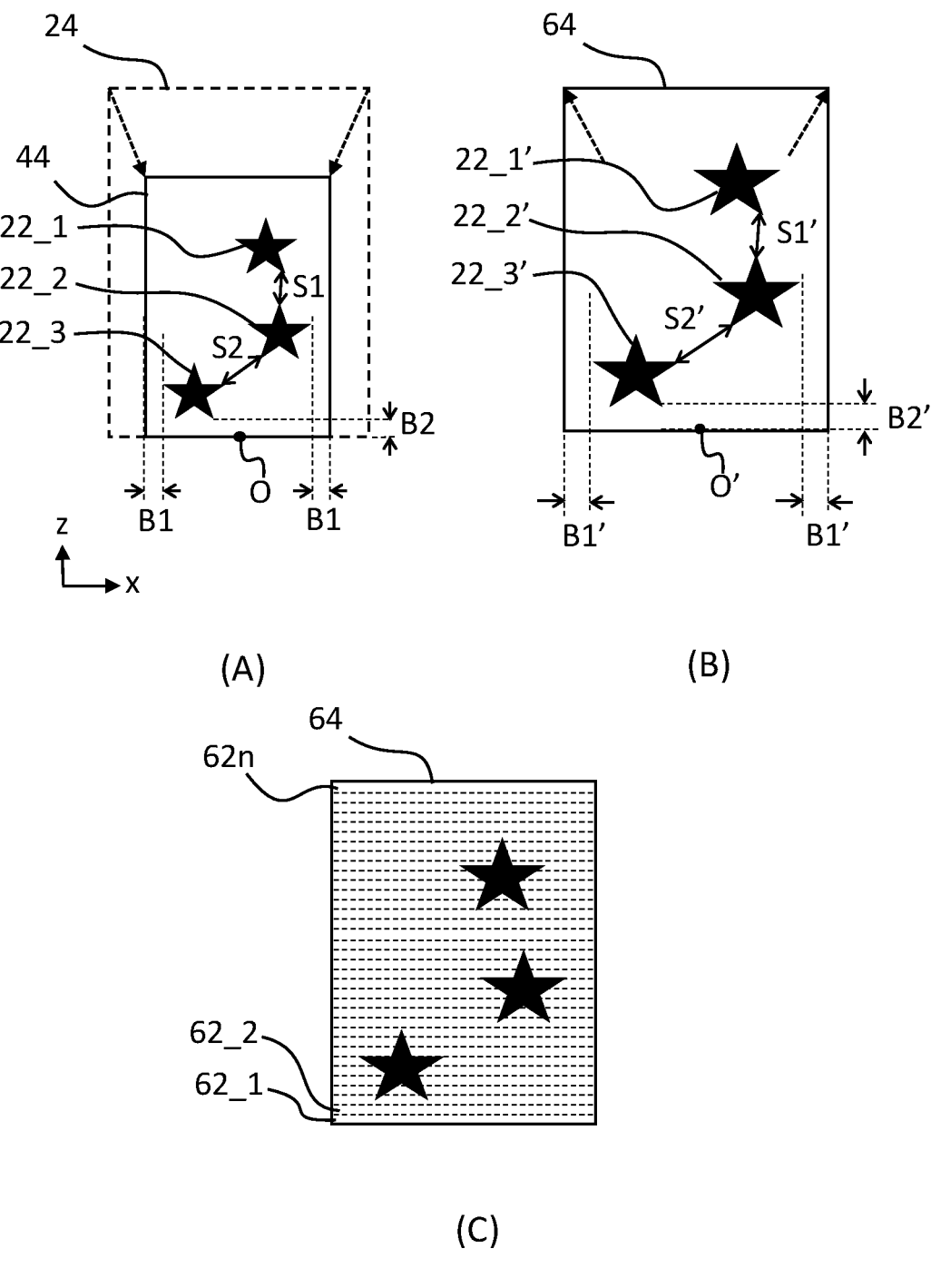
FIG. 3A is a schematic cross-section of the reduced virtual build volume.
FIG. 3B is a schematic cross-section of the expanded virtual build volume.
FIG. 3C is a schematic cross-section of a sliced expanded virtual build volume

Turning now to FIGS. 3A and 3B, FIG. 3A is a schematic side view of a cross section of the reduced virtual build volume 44 in solid outline in relation to a schematic side view of a cross section of the virtual build volume 24 in dashed outline. After generating the reduced virtual build volume 44 from the initial virtual build volume 24 using the reducing transformation, here shown applied with respect to the centre of the floor of the virtual build volume 24, the actual sized object models 22_$n$ are positioned within the reduced virtual build volume 44. The bottom, or floor, of the various virtual build volumes is indicated along the horizontal x-axis, and the vertical direction is indicated along the z-axis. For convenience, the three actual-sized object models 221, 22_2, 22_3 are identical, illustrated by identical solid stars. The object models 22_$n$ are not reduced; they are of the intended or actual size of built objects 2.

In FIG. 3B, the inverse, expanding transformation has been applied to the reduced virtual build volume 44, resulting in the expanded virtual build volume 64. The inverse transformation may for example be the inverse of the reducing transformation so as to expand the reduced virtual build volume 44 back to the dimensions of the initial virtual build volume 24, such that the expanded virtual build volume 64 is of the same dimensions as the initial virtual build volume 24. The three object models 221, 22_2, 22_3 are, along with the reduced virtual build volume 44, also expanded in dimensions according to the inverse transform to form expanded object models 22_1', 22_2', 22_3' within the expanded virtual build volume 64. In other words, the expanded object models 22_1', 22_2', 22_3' are larger than the actual object models 22_1, 22_2, 22_3 so as to compensate for shrinkage in the corresponding actual built objects 2_$n$, and since the initial separations between object models are equally expanded, the expanded object models do not intersect with each other or with a boundary of the expanded virtual build volume 64. It will be appreciated that the transformations applied in FIGS. 3A and 3B are exaggerated to illustrate the effects on the initial, reduced and expanded virtual build volumes and the initial and expanded object models.

Reducing Transformation and Inverse, Expanding Transformation

The reducing transformation and inverse, expanding transformation may be determined based on shrinkage of the objects 2_$n$ and optionally of the actual build volume 14 after completion of the build process of the one or more objects 2 and after cooling of the actual build volume 14. For example, in the actual build volume 14, the sintered or melted cross sections within each layer shrink more than the surrounding non-sintered/non-melted areas. For the purpose of determining a suitable reducing transformation to generate the reduced virtual build volume 44, a "safe" approximation may be to consider a worst-case shrinkage of the build volume 14 if each entire layer of the build volume 24 were to be sintered/melted. The inverse transformation is determined to ensure that the expanded virtual build volume matches the build volume 14 of the apparatus. Thus it is not necessary that the reduced virtual build volume 44 is an accurate physical representation of the shrinkage of the actual build volume in which only cross sectional object regions of each object layer are sintered/melted. The transformation and the inverse transformation are determined such that the expanded virtual build volume 64 is no larger than the actual build volume 14 in any of its dimensions (e.g. for a cuboid build volume 14, the dimensions along orthogonal axes x, y, z, where y points into the page in FIGS. 2 and 3). The reduced virtual build volume 44 may be the same or smaller than the actual build volume 24 after shrinking, i.e. after the build process and after cooling. This may be determined experimentally when first determining a suitable transformation and inverse transformation.

The transformation may be a single multiplier or scaling factor that is applied equally to each dimension of the virtual build volume 24. Alternatively, to address direction dependent shrinkage, the transformation may comprise an individual transformation component for each dimension of the initial virtual build volume 24, and the inverse transformation may comprise an individual inverse transformation component for each dimension of the reduced virtual build volume 44. In this way the transformation may comprise a respective position dependent function that is applied to at least one dimension of the virtual build volume 24. Each transformation component may comprise or consist of a respective scaling factor for the respective dimension of the initial virtual build volume 24. The respective scaling factors for at least two transformation components (i.e. dimensions) may be different. For example, the scaling factor applied along the vertical dimension (along z) may be different to the scaling factor applied to the horizontal dimension (along x and/or y). In some cases, the scaling factor applied to the horizontal dimensions x, y may be the same, although in other cases the scaling factor for each dimension may be different from one another. It will be apparent that in order to achieve a reduction in the initial virtual build volume, at least one of the transformation components causes a reduction in the corresponding dimension of the initial virtual build volume. The remaining dimensions may not require a compensation. In some cases, the horizontal dimensions x, y may require respective, or the same, scaling factor(s) that cause a larger reduction to the initial horizontal dimension than the scaling factor applied to the initial vertical dimension z.

In some cases it may be determined that the actual build volume 14 shrinks at different rates depending on location within the actual build volume. For example, the centre regions may shrink more than the boundary regions of the actual build volume. Therefore, at least one of the transformation components may comprise a position dependent scaling function, and the corresponding inverse transformation component may comprise a position dependent inverse scaling function, such that the initial virtual build volume 24 and the expanded virtual build volume 64 are of the same dimensions while compensating for different shrinkage levels along at least one dimension. The expanded object models 22_n' may thus be distorted with respect to the object models 22_n to compensate for position dependent shrinkage. The position dependent scaling function may be a linear or a non-linear scaling function, and the corresponding inverse scaling function may be the inverse of the linear or non-linear scaling function such that the initial virtual build volume 24 and the expanded virtual build volume 64 are of the same dimensions, and such that each expanded object model 22_n' is expanded non-linearly in the corresponding dimension to which the linear or non-linear inverse scaling function is applied within the expanded virtual build volume 64.

The transformation components and inverse transformation components compensating for position dependent shrinkage may be determined from empirical data of one or more builds of the apparatus. By building experimental objects with approximations of the transformation, the transformation and the inverse transformation may be calibrated and fine tuned against the intended dimensions of the built object(s). They may additionally, or instead, be an approximation or estimate based on shrinkage simulations considering the material expansivity and build process details, such as temperatures and cool down times. Preferably, the inverse transformation is the inverse of the transformation, and each inverse transformation component is the inverse of the corresponding transformation component, such that the expanded virtual build volume 64 is of the same dimensions as the initial virtual build volume 24.

Object Model Separations and Boundary Distances

FIGS. 3A and 3B further illustrate that, for the positioning of the object models 22_n in the reduced virtual build volume 44, spacing distances may be defined that prevent object models to be placed too close to one another or too close to a boundary (side and/or floor) of the reduced virtual build volume 44. For example, the minimum distance separating the closest points between two object models may be defined as a minimum separation distance $S_0$, and the minimum distance between the closest point of an object model and a side wall may be defined as a minimum boundary distance $B_0$. These initial distances may be user-defined or pre-programmed; or they may be automatically selected based on object model, material and process information.

At block 108 therefore, the step of positioning the one or more objects models 22_n may be based on the minimum separation $S_0$, so that for example object models 22_1 and 22_2 are separated by a distance S1 that equals the minimum separation $S_0$, and object models 22_2 and 22_3 are separated by a distance S2 that is greater than the minimum separation $S_0$. After expanding the reduced virtual build volume 44, the expanded object models 22_n' are separated from one another by respective expanded separation distances S1' and S2', both of which are greater than the minimum separation distance $S_0$.

In addition, or alternatively, the step of positioning the one or more objects models 22_n may be based on a minimum boundary distance $B_0$. For example object model 22_3 may be spaced from a side wall of the reduced virtual build volume 44 by a boundary distance B1 that equals the minimum boundary distance $B_0$, and spaced from the floor of the reduced virtual build volume 44 by a boundary distance B2 that equals the minimum boundary distance $B_0$. After expanding the reduced virtual build volume 44, the expanded object model 22_3 is spaced from the side wall and the floor of the expanded virtual build volume 64 by boundary distances B1' and B2' both greater than the minimum boundary distance $B_0$. To optimise or improve the use of the virtual build volume, at block 108, the step of positioning may comprise reducing the various distances Sn, Bn by optimising the position and/or orientation of the one or more object models 22_n in the reduced virtual build volume 44, such that at least one of: the distance Sn, Bn between an object model 22_1, and at least one of another object model 22_2 and a boundary of the reduced virtual build volume 44, is equal to the respective minimum distance $S_0$, $B_0$.

Applying minimum distances $S_0$, $B_0$ based on the virtual build volume 24 in the reduced virtual build volume 44 may mean that the expanded distances Sn', Bn' are greater than necessary and the reduced virtual build volume 44 is not efficiently used. Therefore, optionally, before positioning the object models at block 108 in reduced virtual build volume 44, at least one of the minimum distances $S_0$, $B_0$ may be reduced to reduced minimum distances $S_{0,R}$, $B_{0,R}$ that reflect working the reduced virtual build volume 44. The method may then comprise, at block 108, positioning the one or more object models 22_n such that the distance Sn, Bn between an object model and at least one of: another object model, and a boundary of the reduced virtual build volume; is equal to or greater than the reduced minimum distance $S_{0,R}$, $B_{0,R}$. The reduced distances $S_{0,R}$, $B_{0,R}$ may be calculated based on the minimum separation distance $S_0$ and/or the minimum boundary distance $B_0$ after shrinkage. The reduced minimum distance $S_{0,R}$, $B_{0,R}$ may be based on the transformation. For example the reduced minimum distance $S_{0,R}$, $B_{0,R}$ may be based on, or be transformed by, the transformation component that causes the largest relative reduction to one of the dimensions of the initial virtual build volume 24 as a result of applying the transformation. As an example illustration, again with reference to FIGS. 3A and 3B, the separation distance S1 between object models 22_1 and 22_2 in the reduced virtual build volume 44 may be equal to $S_{0,R}$ and the separation distance S2 between object models 22_2 and 22_3 may be greater than $S_{0,R}$. The boundary distance B1, B2 between object model 22_3 and the side and floor of the reduced virtual build volume 44 may both be equal to $B_{0,R}$. When the reduced virtual build volume 44 is inversely transformed into the expanded virtual build volume 64 at block 110, the object models 22_n and the various distances Sn, Bn of FIG. 3A are expended equally into expanded object models 22_n' (in FIG. 3B expanded object models 22_1', 22_2', 22_3'), expanded minimum separation distances Sn' (S1', S2'), and expanded minimum boundary distances Bn' (B1', B2') within the expanded virtual build volume 64. An optimisation or improvement of the use of the virtual build volume may comprise minimising one or more of the respective separations Sn between object models 22_n to be as close as possible, or equal to, the reduced separation distance $S_{0,R}$. It may further comprise minimising the boundary distances Bn between an object model adjacent to one or more of the boundaries such that a boundary distance Bn is as close as possible to, or equal to, the reduced minimum boundary distance $B_{0,R}$. At block 108, the step of positioning may thus comprise reducing the various distances Sn, Bn by optimising the position and/or orientation of the one or more object models 22_n in the reduced virtual build volume 44, such that at least one of: the distance Sn, Bn between an object model 221, and at least one of another object model 22_2 and a boundary of the reduced virtual build volume 44, is equal the respective reduced minimum distance $S_{0,R}$, $B_{0,R}$. This means that an expanded separation distance Sn' between an expanded object model 22_1' and at least one of another expanded object model 22_1' is equal to or greater than the minimum separation distance $S_0$. Likewise, an expanded boundary distance Bn' between an expanded object model 22_1' and a boundary of the expanded virtual build volume 64 is equal to or greater than the minimum boundary distance $B_0$. Reducing the height of the virtual build volume that comprises the object models results in a smaller number of object layers to form the objects in a build process, and may provide a more efficient process by requiring the lowest number of slices necessary for the object to be built. This reduces build material waste and build time, or conversely allows for more object models to be fitted within the reduced virtual build volume 44 to provide for a maximum number of objects 2_n within the actual build volume 14.

For a safe choice of $S_{0,R}$, $B_{0,R}$, the calculation to arrive at the reduced distances $S_{0,R}$, $B_{0,R}$ may not be the same as the transformation, or the same as the transformation component that causes the largest relative reduction, but instead the reduction may be such that the reduced separation distance $S_{0,R}$ is intermediate to the minimum separation distance $S_0$ and the minimum reduced separation distance resulting from applying the transformation component that causes the largest relative reduction. Similarly, the reduction to the minimum boundary distance $B_0$ may be such that the reduced boundary distance $B_{0,R}$ is intermediate to the minimum boundary distance $B_0$ and the minimum reduced boundary distance resulting from applying the transformation component that causes the largest relative reduction in the minimum boundary distance $B_0$.

The method may further comprise positioning certain object models 22 in certain regions of the reduced virtual build volume 24, for example based on an object model category such as required object model accuracy, object model volume, and/or object model extent along one of the dimensions. Before block 108, preferred location data based on one or more of: object model parameters, build process parameter, and build material parameters within one of the reduced virtual build volume and the initial virtual build volume (wherein the preferred location data within the initial virtual build volume may be converted to preferred location data within the reduced virtual build volume) may be provided, the preferred location data being with respect to certain object model categories. At block 108, an object category is selected for each object model and the one or more object models are positioned based on the respective preferred location data in the reduced virtual build volume 44. For example, for accuracy reasons, some objects may require to be built near the centre of the build volume 14.

Optionally, where the object 2 is build using a layerwise manufacturing process, the method may further comprise a step of generating slice data for a series of parallel slices, the series of parallel slices representing the expanded virtual build volume 64. This is indicated at optional block 112, in dashed outline, in FIG. 1. FIG. 3C illustrates a series of vertically stacked horizontal slices 62_1, 42_2, . . . 62_n dividing the expanded virtual build volume 64. At a further optional block 202 in dashed outline in FIG. 1, the slice data may be provided to an apparatus for the layerwise manufacture of the object(s) 2_n from particulate material in the build volume 14, wherein each slice 62_n defines the cross section of the one or more objects for a corresponding layer.

Herein, the actual build volume 14 may be defined by the actual volume taken up by the particulate material and the object(s) inside it. In the various virtual build volumes, the object model(s) may be spaced at a distance from any of the boundaries of the virtual build volume, and one object model may be vertically offset from another such that upon slicing the expanded virtual build volume, a number of slices may be 'blank' without containing any object model cross section, such that the actual build volume will include 'blank' layers, e.g. supporting or covering the objects, or blank layer between objects arranged vertically displaced from one another. In FIG. 3A, the transformation to create the reduced virtual build volume 44 is applied from a reference coordinate or origin O at the centre of the bottom of the virtual build volume 24. The inverse transformation is applied from an origin O' at the centre of the bottom of the reduced virtual build volume 24 as shown in FIG. 3B. The reference coordinates of the initial, reduced and expanded virtual build volumes may be a common coordinate between the initial, reduced and expanded virtual build volumes, such as the zero origin. It will be understood that the transformation and/or the inverse transformation may be applied with respect to any suitable reference coordinate of the initial virtual build volume 24, and likewise the inverse transformation may be applied from any suitable reference coordinate of the reduced virtual build volume 44, for example from the centre of the virtual build volume or from one of the corners, e.g. from the bottom left or right corner. The selected coordinate origin for applying the inverse, expanding transformation to the reduced virtual build volume may correspond to the selected coordinate origin for applying the reducing transformation to the initial virtual build volume. Furthermore, while herein the build volume is illustrated as a cuboid, the shape of the build volume is not essential. Other build volume shapes such as cylindrical build volumes may be compensated for shrinkage according to the method described herein.

Figure 4:
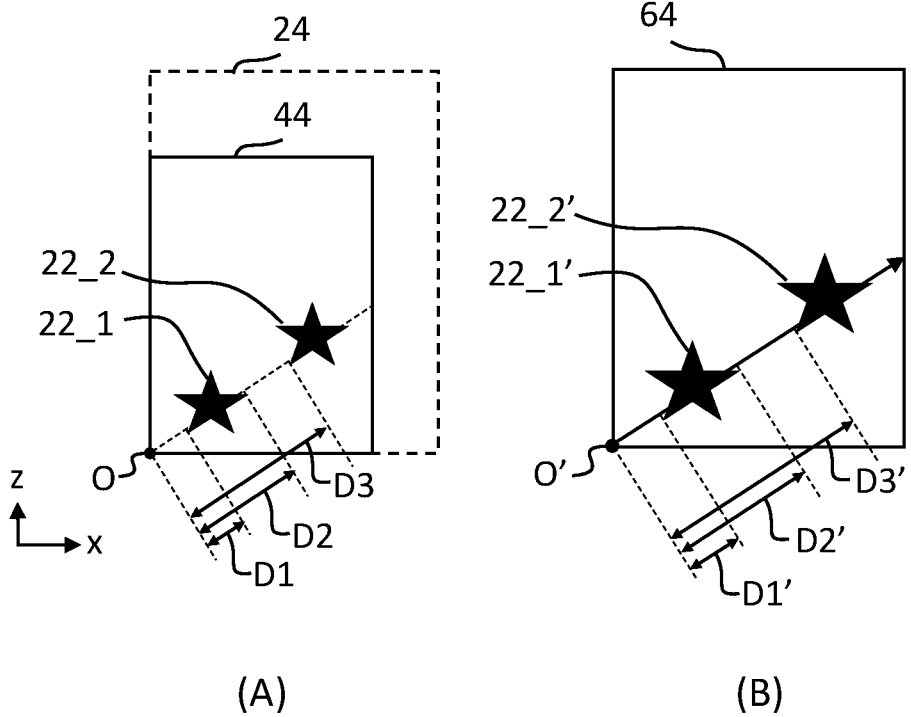
FIG. 4A is a variant of FIG. 3A.
FIG. 4B is a variant of FIG. 3B.

To further illustrate the effect of the methods disclosed herein, FIGS. 4A and 4B illustrate in schematic cross section side view of an initial virtual build volume 24 and a reduced virtual build volume 44, and of the expanded virtual build volume 64, respectively. The inverse, or expanding, transformation is applied to the reduced virtual build volume 44 from the coordinate origin O, x=0, y=0 z=0. For illustrative purpose, distances D from the origin along a line to extreme points of the two object models 221, 22_2, or expanded object models 22_1', 22_2', are shown. The expansion in this case is a linear expansion function. Each distance to a coordinate in the virtual build volume is multiplied by the same expansion factor. It can be seen that the first expanded distance, D1', from the origin to the closest surface of the first expanded object model 22_1', is larger than the first distance D1 in the reduced virtual build volume. The second expanded distance, D2', from the origin to the farthest surface of the first expanded object model 22_1' is larger than the second distance D2 in the reduced virtual build volume. The third expanded distance, D3', from the origin to the nearest surface of the second expanded object model 22_2' is larger than the third distance D3 in the reduced virtual build volume. Any coordinate of the reduced virtual build volume is moved further away from the zero coordinate of the reduced virtual build volume, such that object model dimensions and separation distances are equally expanded. In this way, collisions or intersections between expanded object models, or between an expanded object model and a boundary of the expanded virtual build volume, can be prevented.

It will be apparent that the object models 22_n may be the same or represent different objects that are to be placed in the reduced virtual build volume 44.

Typically, a processor configured to carry out the steps of the method disclosed herein may be a processor remote from the apparatus. The processor may be a computer or microprocessor provided with a program that, when executed, causes any one or more of the steps to be carried out of: applying the transformation to the initial virtual build volume so as to create a reduced virtual build volume smaller in volume than the virtual build volume; receiving and positioning the one or more object models within the reduced virtual build volume; and applying, from a single, common origin, the inverse transformation to expand the reduced virtual build volume comprising the one or more object models, thus creating an expanded virtual build volume comprising the one or more expanded object models. In this way, each of the one or more expanded object models is larger than the respective one or more object models, and a distance from the common origin of the expanded virtual build volume to any coordinate of each expanded object model is larger than a distance from the common origin of the reduced virtual build volume to a respective coordinate of each object model. In this way the reduced virtual build volume and the one or more object models, and the separation distances and boundary distances, are expanded from the common origin by the same inverse transformation away from the origin. The controller may further comprise, or be configured to access, a data storage device storing the object model data, the transformation or reduced build volume, and the inverse transformation, for example. A computer program may be provided comprising instructions which, when the program is executed by the processor, e.g. a computer, cause the processor to carry out the method and its variants as described herein. The method may thus be a purely computer implemented method to reduce the initial virtual build volume to generate the reduced virtual build volume, place or fit the object models in the reduced virtual build volume, expand the reduced virtual build volume to the expanded virtual build volume, and optionally to generate slice data that may subsequently be provided to an apparatus for the layerwise manufacture of the object(s) and provide the slice data to an apparatus for the layerwise manufacture of the one or more objects, for example layer by layer from particulate material. The method may further comprise manufacturing the one or more objects in the build volume 14 of the apparatus based on the slice data of slices 62_n.

The invention claimed is:

1. A method of generating slice data of three-dimensional object models for an apparatus for the layerwise manufacture of three-dimensional objects, wherein the method comprises the steps of:

(a) receiving one or more object models, the one or more object models defining the intended dimensions of each of the one or more objects;

(b) applying a transformation to an initial virtual build volume so as to create a reduced virtual build volume smaller in volume than the initial virtual build volume, wherein the initial virtual build volume represents an actual build volume over which the one or more objects are to be built;

(c) positioning the one or more object models within the reduced virtual build volume;

(d) applying, from a common origin of the reduced virtual build volume, an inverse transformation to expand the reduced virtual build volume including the one or more object models, such that the reduced virtual build volume and the one or more object models are expanded by the inverse transformation from the common origin to create an expanded virtual build volume including one or more expanded object models, wherein each of the one or more expanded object models is larger than the respective one or more object models and a distance from the common origin to each of the one or more expanded object models is larger than a distance from the common origin of the reduced virtual build volume to the respective one or more object models; and (e) generating slice data for the one or more object models based on the expanded virtual build volume.

2. The method of claim 1, wherein the inverse transformation is the inverse of the transformation, such that the expanded virtual build volume is of the same dimensions as the initial virtual build volume.

3. The method of claim 1, wherein the transformation comprises a transformation component for each dimension of the initial virtual build volume, and wherein the inverse transformation comprises an inverse transformation component for each dimension of the reduced virtual build volume.

4. The method of claim 3, wherein each transformation component comprises a scaling factor for the respective dimension of the initial virtual build volume, optionally wherein the respective scaling factors for at least two of the dimensions are different from one another.

5. The method of claim 4, wherein at least one of the scaling factors reduces the corresponding dimension of the initial virtual build volume.

6. The method of claim 3, wherein at least one of the transformation components comprises a position dependent scaling function, and wherein the corresponding inverse transformation component comprises a position dependent inverse scaling function, such that the initial virtual build volume and the expanded virtual build volume are of the same dimensions.

7. The method of claim 6, wherein the position dependent scaling function is a non-linear scaling function, and the corresponding inverse scaling function is the inverse of the non-linear scaling function such that the initial virtual build volume and the expanded virtual build volume are of the same dimensions, and such that each of the one or more object models is expanded non-linearly in the corresponding dimension to which the non-linear inverse scaling function is applied within the expanded virtual build volume.

8. The method of claim 1, wherein the common origin is an origin of the initial virtual build volume, and the transformation is applied with respect to the common origin.

9. The method of claim 1, further comprising receiving a minimum distance, and wherein step (c) comprises positioning the one or more object models within the reduced virtual build volume such that a distance between an object model and at least one of: another object model, and a boundary of the reduced virtual build volume; is equal to or greater than the minimum distance.

10. The method of claim 9, further comprising a step of reducing the minimum distance to a reduced minimum distance, and wherein step (c) includes positioning the one or more object models such that the distance between an object model and at least one of: another object model, and a boundary of the reduced virtual build volume; is equal to or greater than the reduced minimum distance.

11. The method of claim 10, wherein the reduced minimum distance is based on the transformation.

12. The method of claim 9, further comprising, during step (c), optimising the position and/or orientation of the one or more object models within the reduced virtual build volume such that at least one of: the distance between an object model, and at least one of another object model and a boundary of the reduced virtual build volume; is equal to the minimum distance, or equal to the reduced minimum distance.

13. The method of claim 1, wherein the transformation includes a transformation component for each dimension of the initial virtual build volume, and wherein the inverse transformation includes an inverse transformation component for each dimension of the reduced virtual build volume;

wherein the method further comprises:

a step of receiving a minimum distance, and wherein step (c) includes positioning the one or more object models within the reduced virtual build volume such that a distance between an object model and at least one of: another object model, and a boundary of the reduced virtual build volume; is equal to or greater than the minimum distance; and a step of reducing the minimum distance to a reduced minimum distance, and wherein step (c) includes positioning the one or more object models such that the distance between an object model and at least one of: another object model, and a boundary of the reduced virtual build volume; is equal to or greater than the reduced minimum distance;

wherein the reduced minimum distance is based on the transformation component that causes the largest relative reduction to one of the dimensions of the initial virtual build volume as a result of applying the transformation.

14. The method of claim 1, wherein the transformation is determined based on shrinkage of the build volume after completion of a build process of the one or more objects and after cooling of the actual build volume.

15. The method of claim 1, further comprising receiving, based on one or more of: an object model parameter, an object model category, a build process parameter, and a build material parameter, preferred location data within the reduced virtual build volume, or within the initial virtual build volume and converting the preferred location data to preferred location data within the reduced virtual build volume; and wherein the step (c) includes positioning the one or more object models within the reduced virtual build volume based on the preferred location data in the reduced virtual build volume.

16. The method of claim 1, further comprising the step of providing the slice data to an apparatus for the layerwise manufacture of an object from particulate material, wherein each slice of the slice data defines the cross section of the one or more objects for a corresponding layer.

17. The method of claim 16, further comprising manufacturing the one or more objects in the actual build volume of the apparatus based on the slice data.

18. A processor configured to carry out the method according to claim 1.

19. A non-transitory machine readable medium executable by a processor, and comprising instructions to carry out the method of claim 1.

* * * * *